United States Patent
Angenent et al.

(10) Patent No.: US 6,697,538 B1
(45) Date of Patent: Feb. 24, 2004

(54) APPARATUS FOR PRODUCING A FLATTENING MAP OF A DIGITIZED IMAGE FOR CONFORMALLY MAPPING ONTO A SURFACE AND ASSOCIATED METHOD

(75) Inventors: Sigurd B. Angenent, Madison, WI (US); Allen R. Tannenbaum, Smyrna, GA (US); Steven Haker, New Haven, CT (US); Ron Kikinis, Brookline, MA (US)

(73) Assignee: Wisconsin Alumni Research Foundation, Madison, WI (US)

( * ) Notice: Subject to any disclaimer, the term of this patent is extended or adjusted under 35 U.S.C. 154(b) by 610 days.

(21) Appl. No.: 09/627,512

(22) Filed: Jul. 28, 2000

Related U.S. Application Data

(60) Provisional application No. 60/146,554, filed on Jul. 30, 1999.

(51) Int. Cl.[7] ............................ G06K 9/36; G06F 1/02; G06F 17/50
(52) U.S. Cl. ........................ 382/285; 708/270; 716/20
(58) Field of Search ............................. 382/285, 173, 382/203, 241; 708/274, 446, 270; 716/20; 345/418, 653; 700/182

(56) References Cited

U.S. PATENT DOCUMENTS

| | | | |
|---|---|---|---|
| 4,710,876 A | 12/1987 | Cline et al. | 364/414 |
| 4,797,842 A * | 1/1989 | Nackman et al. | 716/20 |
| 4,953,094 A * | 8/1990 | Letcher, Jr. | 700/182 |
| 5,107,444 A | 4/1992 | Wu | 395/119 |
| 5,442,569 A * | 8/1995 | Osano | 716/20 |
| 5,717,621 A * | 2/1998 | Gupta et al. | 708/446 |
| 5,754,181 A * | 5/1998 | Amdursky et al. | 345/419 |
| 5,886,706 A | 3/1999 | Alcorn et al. | 345/430 |
| 5,898,438 A | 4/1999 | Stewart et al. | 345/425 |
| 5,900,880 A | 5/1999 | Cline et al. | 345/423 |
| 5,966,524 A * | 10/1999 | Burnett et al. | 703/5 |
| 5,986,604 A * | 11/1999 | Nichols et al. | 342/357.12 |
| 6,078,938 A * | 6/2000 | Pan et al. | 708/500 |
| 6,273,596 B1 * | 8/2001 | Parkyn, Jr. | 362/522 |
| 6,300,958 B1 * | 10/2001 | Mallet | 345/442 |

OTHER PUBLICATIONS

Listed Here—For It's Background Reference Information Only Grimson, W. Eric L., *Scientific American* 62 (Jun. 1999).

Pedersen, Hans K., *Computer Graphics Proceedings, Annual Conference Series* 295 (1996).

This paper has appeared in *Archive for Rational Mechanics and Analysis* Kichenassamy, et al., 134 *Archinve for Rational Mechanics and Analysis* 275 (1996).

* cited by examiner

*Primary Examiner*—Bhavesh M. Mehta
*Assistant Examiner*—Kanji Patel
(74) *Attorney, Agent, or Firm*—Macheledt Bales LLP

(57) ABSTRACT

A computerized apparatus and associated method and program code on a storage medium, for producing a flattening map of a digitized image. This image may be initially synthetically produced as discrete data or as quasi-discrete image data of a real object—and the original image data may be stored as two-, three-, or four-dimensional dynamic coordinate data. Once produced, the flattening map can be conformally mapped onto the computer generated surface (whether 2-D, 3-D, or any of the dynamically-varying family of surfaces) for display on a computer-assisted display apparatus in communication with a processor. The apparatus and associated method and program code include constructing a first set of data comprising a plurality of discrete surface-elements to represent at least a portion of a surface of the digitized image, and performing a flattening function on the first set of data to produce the flattening map. The flattening function includes computing, for each discrete surface-element, a solution to each of two systems of linear equations formulated from finding a numerical solution to a selected partial differential equation (PDE), and can be performed on each of a series of data sets changing over time to produce a corresponding series of flattening maps.

20 Claims, 4 Drawing Sheets

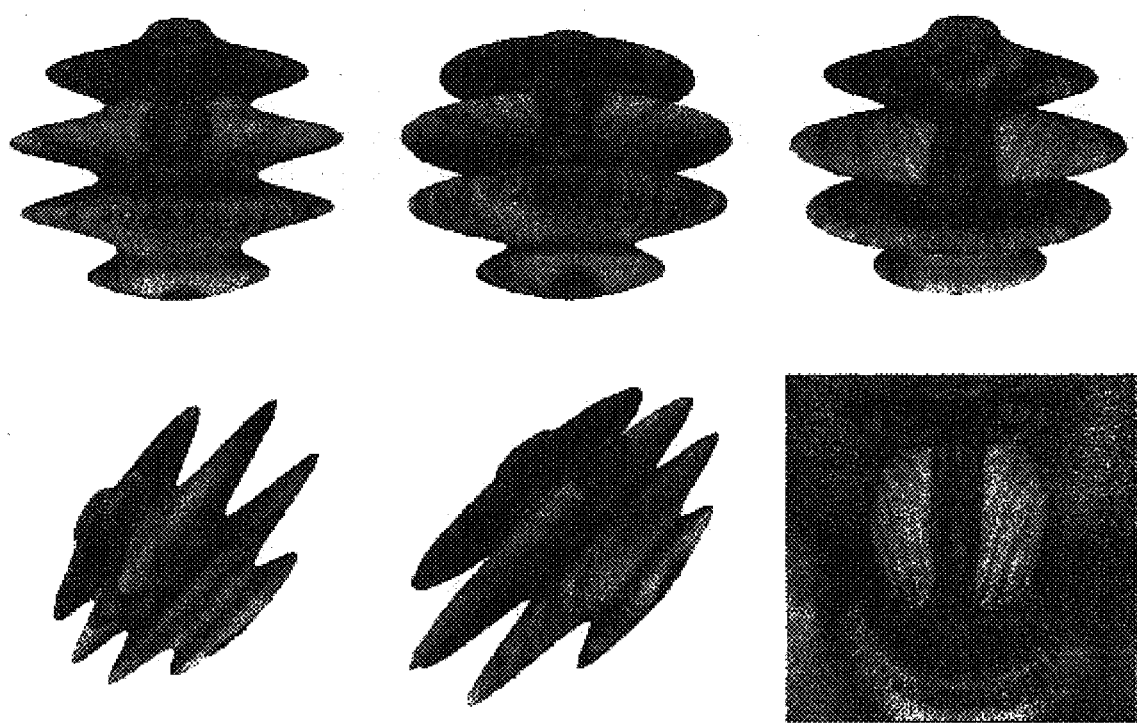
Figure 1: Mandrill Image on Synthetic Surface
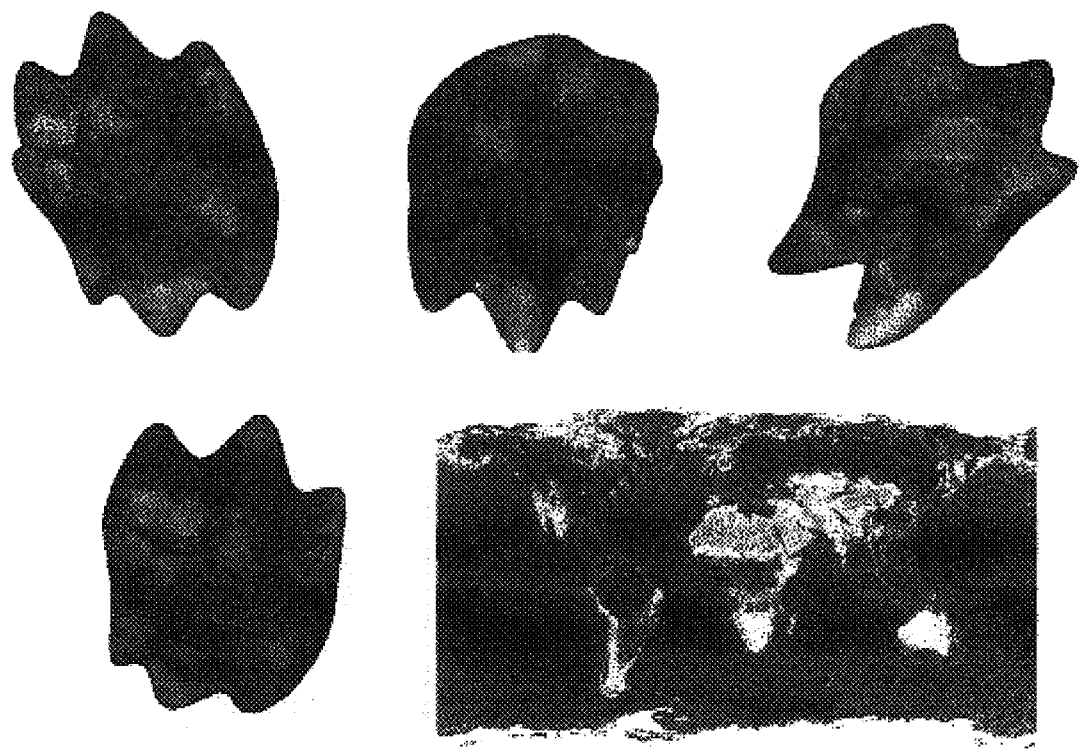
Figure 2: Thermal Image of Earth on Synthetic Surface

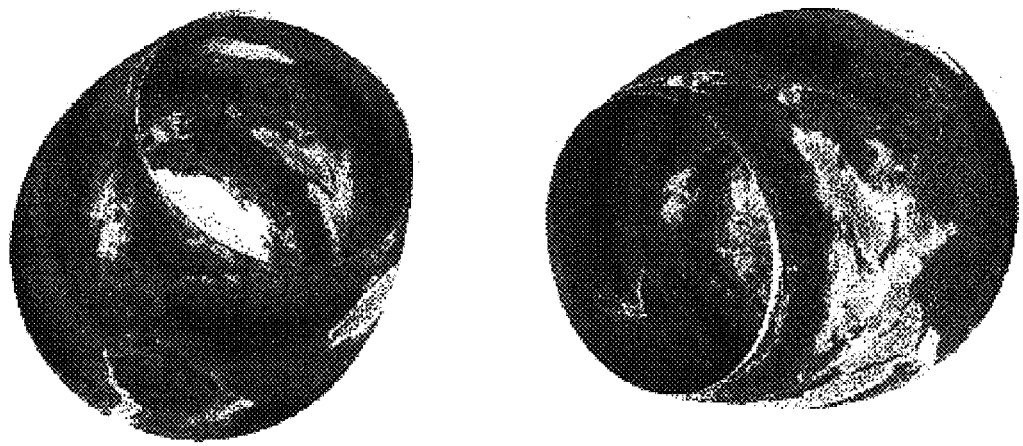
Figure 3: Earth on Inside and Outside of a Vase
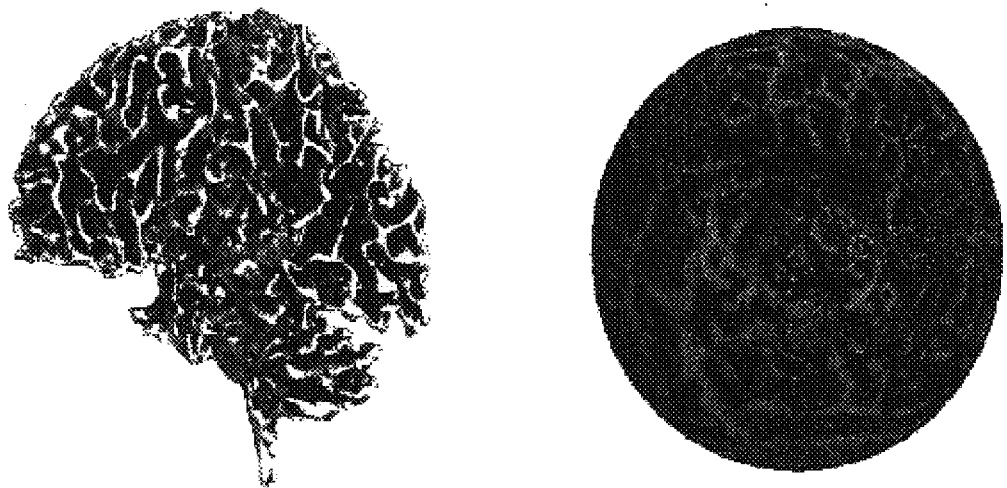
Figure 4: Two Views of Flattened White Matter

APPARATUS FOR PRODUCING A FLATTENING MAP OF A DIGITIZED IMAGE FOR CONFORMALLY MAPPING ONTO A SURFACE AND ASSOCIATED METHOD

This application claims priority under 35 U.S.C. 119(e) and 37 C.F.R. §1.78 to Provisional Patent Application U.S. 60/146,554 filed Jul. 30, 1999.

The invention disclosed herein was made with United States government support awarded by the following agencies: National Institute of Health (NIH) P41 RR13218 and National Science Foundation (NSF) 9800894, DMS-9058492, ECS-9700588, by the Air Force Office of Scientific Research AF/F49620-98-1-0168, and by the Army Research Office DAAG55-98-1-0169. Accordingly, the U.S. Government has certain rights in this invention.

BACKGROUND OF THE INVENTION

In general, the present invention relates to computer vision and image processing and more specifically, the mapping of an image stored in a computer-teadable format onto a computer generated surface. Basic techniques have been proposed for the limited purpose of obtaining a flattened computerized image or representation of a convoluted surface such as the cortical surface of a mammalian brain to aid in the visualization of this very complex structure. The computer graphics process known as 'texture mapping' has been limited to the process of transferring a two-dimensional image (a digitized photograph or artificially produced picture or graphic) onto a three-dimensional computer generated surface. However, here more particularly, the invention relates to a novel technique of conformally mapping any image that can be stored in a computer-readable format as two-, three-, or four- dimensional dynamic coordinate data, onto two-, three-, or a dynamically-varying family of surfaces, respectively. Of particular interest is the application of a very unique flattening function (derived from numerically approximating a selected partial differential equation, PDE) to surface data of an original digitized image. The surface data can comprise triangulated or other-shaped elements, cells, patches, segments, or portions thereof, that has been extracted as necessary from original image data to remove handles, holes, self-intersections, and so on, to produce a generally smooth manifold upon which the flattening function can be performed to produce a flattening map. The novel computerized mapping technique of the invention generally preserves angles of the original image as mapped and the mapping performed is bijective (onto and one to one).

Prior techniques have been proposed to obtain a flattened/planar representation of a 'real' object such as the complex cortical surface of a human brain (as described in the medical imaging literature): The collaborators hereof have addressed limitations to these proposed/known methods. For example, in one published paper the scientific authors fit a parameterized deformable digitized surface of a brain whose topology is mappable onto a sphere and then 'flatten' the sphere to create a planar map by using spherical coordinates. In other algorithms proposed for the purpose of 'flattening' a brain image using quasi-isometrics and quasi-conformal flattenings approaches, the scientists started with a triangulated representation of a given image of the cortical surface and employ a relaxation method to discretely minimize an energy functional. Unfortunately, bijectivity cannot be preserved in when using this prior approach, and in particular, there is a chance that the tiny triangle shaped patched of the triangulated surface will flip during the quasi-isometrics or quasi-conformal process (and if any number of the tiny triangles do flip, the resulting flattened representation is not true and, in fact, can become quite distorted). By way of review for reference, bijection occurs when: A mapping f from a set A onto a set B which is both an injection and a surjection; that is, for every element b of B there is a unique element a of A for which f(a)=b.

The technique of the invention is very distinguishable from prior mapping approaches. As it will be better appreciated, the novel technique provides for an explicit construction of the bijective conformal equivalence on a continuous model of the surface being mapped, and only then is there a move toward the discrete implementation. Key and surprising differences include: the flattening function performed according to the invention is preferably obtained as the solution of a selected second-order elliptic partial differential equation (PDE) on the surface to be flattened; this selected PDE can then readily be approximated using a finite element approximation on a triangulated (or other discrete-element shaped) representation of the original surface; and further, the novel flattening function performed on a constructed set of surface data (extracted and/or smoothed to reduce effects of aliasing, as desired), can be derived from identifying solutions to two sparse systems of linear equations treated using the conjugate gradient method. In the event the surface on which the flattening function of the invention is performed is constructed as a triangulated surface, one can use a known fast segmentation method to adequately represent the iso-surface as a triangulated surface of a digitized synthetic or 'real' image of an object (e.g., a cortical surface).

The ingenious technique described herein produces a mapped image, or a series of dynamically-mapped sequential images that represent changes in time to the original image (for example, a beating human heart or when digestive byproduct moves through a colon causing the colon surfaces to change shape), that locally preserves certain important characteristics (shape and angles) of each original image. And, unlike known prior graphics flattening algorithms or computerized graphics texture mapping processes, original image characteristics are preserved even when the surface on which the image is being mapped is quite different from the surface of the original image (for example, an image of brain white matter conformally maps quite clearly onto a sphere and a spherical image of the earth is readily mapped onto an odd synthetic 'blob' shape). The instant invention permits the construction, among other things, of a bijective conformal equivalence from a given image's surface (generally having holes or handles removed) onto a sphere, onto a planar domain (such as a rectangle), or onto other preselected two-, three-, or a dynamically-varying family of surfaces. The conformal flattening process maps the surface in a manner that preserves both the angles of and, locally, the shape of the original image.

In order to more-fully understand the invention, details of the rigorous mathematical analysis which has been done of this new technique follow along with illustrations of several conformal mapping examples. As one will better appreciate, one can employ graphics coloring techniques after performing the novel method of producing a flattening map of complex, time-varying digitized surfaces to create beautiful motional graphical images for a wide variety of applications—from medial diagnostic, product and process design, to pure entertainment. The flattening function and conformal mapping can be performed, with an original digitized image stored as two-, three-, and four-dimensional dynamic coordinate data onto a two-, three-, plus the dynamically-varying family of surfaces—thus, the invention is not limited to 2-D (planar) to 3-D texture mapping of still images.

SUMMARY OF THE INVENTION

It is a primary object of this invention to provide a computerized apparatus and associated method and program code on a storage medium, for producing a flattening map of a digitized image, whether this image is initially synthetically produced as discrete data (for example, a computer generated graphic) or originates as quasi-discrete image data of a real object (e.g., produced as a result of a digital photo, an x-ray, diagnostic scan, document scan, and so on)—and whether the original image data is stored as two-, three-, or four-dimensional dynamic coordinate data. The flattening map can be conformally mapped onto a computer generated surface (whether 2-D, 3-D, or any dynamically-varying family of surfaces) that can be displayed on a computer-assisted display apparatus in communication with a processor. The apparatus and associated method and program code include constructing a first set of data comprising a plurality of discrete surface-elements to represent at least a portion of a surface of the digitized image, and performing a flattening function on the first set of data to produce the flattening map.

Certain advantages of providing the novel computerized apparatus and associated new method and program code stored on a computer readable storage medium, as described and supported hereby, are as follows:

(a) The apparatus and method can produce not only a single mapped image for viewing and/or printout in hard copy form, as well as for electronically storage, but also can produce a series of dynamically-mapped sequential images that represent changes in time to the original image (for example, watching a beating human heart or monitoring brain activity or colon activity using functional magnetic resonance data), that locally preserves certain important characteristics (shape and angles) of each original image.

(b) Application Versatility—The invention can be used for analysis within a wide range of environments such as medical applications (e.g., for image-guided surgery and non-invasive diagnostic imaging to better view images of complex anatomy, plus real-time/dynamic monitoring and treatment of patients); product and process design research & development for analysis/viewing composite structures and composite materials such as those encountered in integrated circuit and printed circuit board fabrication; product design and analysis of vehicle component s and assemblies (including vehicles that travel over ground, through the air, into outer space, etc.); creating automatic angle-preserving 3-D texture mapping onto synthetic surfaces to create 'composite' graphic images that can be used in the computer-animation of movies, cartoons, virtual-reality systems/devices, image registration for educational and entertainment purposes; creating conformally mapped graphic images using 2-D, 3-D, and dynamically-varying family of surfaces for specific purposes such as non-invasive virtual colonoscopy to detect presence of pathologies, shading of geographic, atmospheric, galactic, and weather maps, and so on.

(c) Simplicity and Versitility of use—With relative ease, the new computerized apparatus and associated program code can be run with, and the new method can be installed onto, readily operated, updated, and uninstalled from existing computer equipment running any of a number of master control programs such as any UNIX- or LINUX-, WINDOWS™-, WINDOWS NT™-, and MACINTOSH®-based operating system.

(d) Design Flexibility—A flattening map produced according to the invention from extracted discrete surface-element data (such as the tiny triangle patches of a triangulated surface—e.g., the 'blob' illustrated in FIG. 5) to which the novel flattening function has been applied, can be used alone to produce valuable surface-flattening information about an original image, or it can be used to create a wide variety of conformally mapped surfaces; for example, a portion of one or several original images may be extracted, or the whole image can be extracted, to automatically in a piece-meal fashion reconstruct a composite mapped image made of 'real' and synthetic parts of different original (well-preserved) image components. Further, the flattening function can be employed to produce a flattening map of a single selected original image (such as the cortical structure in FIG. 4) and conformally mapped onto several different computer-generated shapes such as a sphere, a blob, a cylinder, and a square.

(e) Speed of Application—The novel use of the Laplace-Beltrami operator (designated by the Greek symbol, $\Delta$) contained within the two sparse systems of linear equations computed to create the flattening map (and the application of newly-identified boundary conditions to derive these linear equations), allows for much faster and more-efficient conformal mappings of original images (whether of convoluted real objects or synthetic images) onto convoluted (or simple) computer-generated surfaces.

(f) Process Simplification—The use of infinitely small (in a 'mathematical sense') discrete surface-elements or patches (regardless of shape) to closely approximate the original image surface, plus the straightforward calculations made of a solution for a second-order elliptic partial differential equation (PDE) derived after having, first, identified, applied, and simplified a series of key complex mathematical theories and algorithms on each surface-element, has simplified in a novel and unexpected way the process of creating a well-preserved flattened map of an original image.

(g) Reliability and robustness—The novel flattening procedure has been shown to be highly robust to various types of transformations including affine deformations of the pre-image data as well as triangle decimation on the image surface.

Briefly described, once again, the invention includes a computerized apparatus and associated method and program code on a storage medium, for producing a flattening map of a digitized image, whether this image is initially synthetically produced as discrete data (for example, a computer generated graphic) or originates as quasi-discrete image data of a real object (e.g., produced as a result of a digital photo, an x-ray, diagnostic scan, document scan, and so on)—and whether the original image data is stored as two-, three-, or four-dimensional dynamic coordinate data. The digitized image may be of a variety of real objects such as a cortical structure (any outer portion of a mammalian organ or other structure, e.g. a brain, adrenal gland, colon, and so on), considered quasi-discrete data, or the image may be one that comprises purely computer-generated discrete data, which can include a composite of many synthetic images. In the case where the image is of a real object, it may be desirable to extract surface-element data from the image's surface to eliminate handles, holes and other disruptions and provide a generally smooth manifold upon which to perform the flattening function; and further it may be necessary to smooth the quasi-discrete data of the real object's surface to reduce effects of aliasing. Once produced, a flattening map can be conformally mapped onto the computer generated surface (whether 2-D, 3-D, or any of the dynamically-varying family of surfaces) for display on a computer-assisted display apparatus in communication with a processor. The apparatus and associated method and program code include constructing a first set of data comprising a plurality of discrete surface-elements to represent at least a portion of a surface of the digitized image, and performing a flattening function on the first set of data to produce the flattening map.

Features that further distinguish the apparatus, method, and program code of the invention from conventional techniques, include: The flattening function includes computing, for the discrete surface-elements, a solution to each of two systems of linear equations formulated from finding a numerical solution to a selected partial differential equation (PDE). These constructed surface-elements can be representative of triangulated areas, random-shaped areas or patches, surface points, pixels, sub-pixels, cells, sub-cells, segments, and sub-segments, and so on. The two systems of linear equations are preferably formulated by applying a finite-element approximation comprising a sparse matrix, the selected PDE preferably comprises the expression $$\Delta z = \left( \frac{\partial}{\partial u} - i \frac{\partial}{\partial v} \right) \delta_p \qquad \text{Eq. (1)}$$

thus, the two systems of linear equations can comprise the expressions $$D_x = a \qquad \text{Eq. (2)}$$

$$D_y = -b; \text{ and} \qquad \text{Eq. (3)}$$

the flattening function can further comprise the identification of values for the variables $D_{PQ}$, $a_Q$ and $b_Q$ using at least the following expressions:

$$D_{PQ} = -\frac{1}{2}\{\cot\angle R + \cot\angle S\}, \ P \neq Q \qquad \text{Eq. (4)}$$

$$D_{PP} = -\sum_{P \neq Q} D_{PQ} \qquad \text{Eq. (5)}$$

$$a_Q - ib_Q = \begin{cases} 0, & Q \notin \{A, B, C\} \\ \frac{-1}{\|B-A\|} + i\frac{1-\theta}{\|C-E\|}, & Q = A \\ \frac{1}{\|B-A\|} + i\frac{\theta}{\|C-E\|}, & Q = B \\ i\frac{-1}{\|C-E\|}, & Q = C \end{cases} \qquad \text{Eq. (6)}$$

As identified above, and further according to the invention, computing a solution to each of the two systems, namely Eqs. (2) and (3), results in the piecewise linear functional expressions $$x = \sum_Q x_Q \phi_Q \qquad \text{Eq. (7)}$$

$$y = \sum_Q y_Q \phi_Q \qquad \text{Eq. (8)}$$

such that x and y are conformally mapped according to the expression z=x+iy onto a preselected computer-generated surface for display. Further, in the case where the digitized image changes shape over time, the first set of data can be constructed to further comprise a series of corresponding sets of data over time such that the flattening function is performed on each of the series of data sets to produce a corresponding series of the flattening maps.

Also characterized is a method for producing a flattening map of a digitized image, comprising the steps of: constructing a first set of data with a processor, this data comprising a plurality of discrete surface-elements to represent at least a portion of a surface of the digitized image; and performing a flattening function on the first set of data to produce the flattening map. The flattening function to comprise computing, for each discrete surface-element, a solution to each of two systems of linear equations formulated from finding a numerical solution to a selected partial differential equation (PDE). Also characterized is a computer executable program code on a computer readable storage medium for producing a flattening map of a digitized image. The program code includes: a first program sub-code for constructing a first set of data comprising a plurality of discrete surface-elements to represent at least a portion of a surface of the digitized image; and a second program sub-code for performing a flattening function on the first set of data to produce the flattening map. The second sub-code includes instructions for computing, for each discrete surface-element, a solution to each of two systems of linear equations formulated from finding a numerical solution to a selected partial differential equation (PDE). The method and program code can further include a third program sub-code for conformally mapping the flattening map onto a computer-generated 3D surface for display on a computer-assisted display apparatus. The further distinguishing features set forth above, will be readily appreciated in connection with the following description.

BRIEF DESCRIPTION OF THE DRAWINGS

For purposes of illustrating the innovative nature plus the flexibility of design and versatility of the preferred computerized apparatus and associated method and computer code on a computer readable storage medium, the invention will be more particularly described by referencing the accompanying drawings of preferred and alternative embodiments and features the invention (in which like numerals, if included, designate like parts). The figures and any accompanying published papers identified herein authored by the applicants have been included to communicate features of the invention by way of example, only, and are in no way intended to unduly limit the disclosure hereof.

FIGS. 1 through 4 are of digitized images before, and after, employing the flattening function and a conformal mapping onto a chosen set of surface data (whether extracted and/or smoothed to produce an effective surface of genus zero) according to the instant invention. Each of these examples of a conformally-mapped image has also been 'colored' according to any of the known coloring techniques and printed (although photocopied and shown, here, in black and white).

DETAILED DESCRIPTION OF THE PREFERRED EMBODIMENTS

Figure 5:
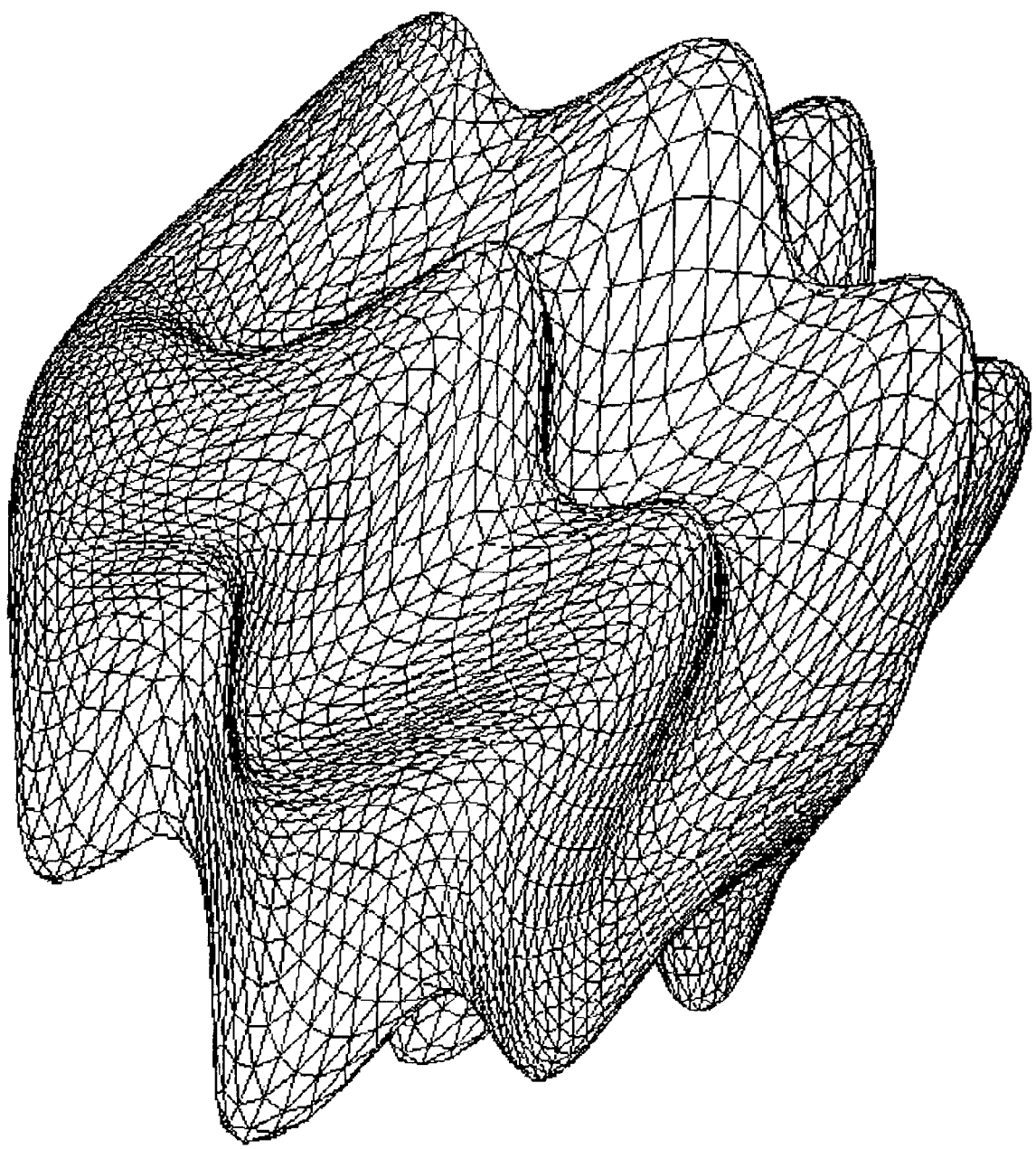
FIG. 5 is an illustration of a triangulated surface in the form of a 'blob'. One can employ a known segmentation algorithm to a digitized original image to create such a triangulated surface.

The following identified paper [1] was authored by the applicants hereof and published after the effective filing date of the above referenced provisional application for the instant invention. Item [1] as well as background items [2], [3], [4], [5], and [6] have been included herewith for purposes of general reference and support.

[1] S. Angenent, S. Haker, A. Tannenbaum, and R. Kikinis, "On the Laplace-Beltrami Operator and Brain Surface Flattening," *IEEE Trans. on Medical Imaging*, vol. 18, pp. 700–711, 1999; the detailed discussion concerning the mathematical derivations and approximations set forth therein are hereby fully incorporated by reference herein as further support.

[2] A. Tannenbaum, "Three snippets of curve evolution theory in computer vision," *Journal of Mathematical and Computer Modelling* 24 (1996), pp. 103–119.

[3] C. T. A. Johnk, *Engineering Electromagnetic Fields and Waves*, John Wiley & Sons, Inc., New York, pp. 88–93, 1988. Included herewith as general background information on the, well known, Laplacian and curl operators to study electromagnetism.

[4] Attachment A includes general reference information from a Computer Desktop Encyclopedia concerning computer graphics, as the creation and manipulation of picture images utilizing a computer.

[5] Attachment B includes general reference information about the algorithm commonly known as "marching cubes" which can be used to construct a triangulated surface. This algorithm is a surface-fitting algorithm for visualizing isosurface 3D graphics.

[6] Attachment C includes general reference information about the algorithm commonly known as "dividing cubes", an update of the marching cubes algorithm, which can be used to construct a surface of subcell-elements. Contrast with marching cubes: rather than calculating the approximate iso-surface through a cell, the dividing cubes-algorithm first projects all cells that are intersected by the iso-surface to the image/screen space. If the cell projects to a larger area than a pixel it is divided into subcells and rendered as a surface point, Otherwise the whole cell is rendered as a surface point.

FIG. 1 illustrates a color-printout of a Mandrill Monkey image that has been conformally mapped using the technique of the invention, onto several synthetic 'blob'-shaped surfaces. One can readily further appreciate the flexibility of the novel features of the invention from the following figures. Like FIG. 1, FIG. 2 illustrates a color-printout of a flattened (2-D) image of a thermal diagram of earth that has been conformally mapped onto several synthetic 'blob'-shaped surfaces. A flattened (2-D) image of a thermal diagram of earth (see FIG. 2) has, in FIG. 3, been conformally mapped onto a vase-shape. FIG. 3 includes two 3-D views illustrating the conformal mapping onto a vase looks from the inside and outside of the vase-structure.

FIG. 4 illustrates two views of the highly convoluted surface of a cortical surface, here, a human brain whose points have been colored according to a known the 'mean curvature' process, and copied in black and white, taken before and after being conformally mapped onto a sphere-shape. One can readily appreciate how the sulci (indentations) and gyri (protrusions) are clearly represented on the sphere, with a good preservation of local geometry of the original brain images, after employing the novel method of producing a flattening map and conformal mapping technique of the instant invention. Any of the images in FIGS. 1 through 4 shown after employing the flattening function and a conformal mapping of the invention, can readily be colored according to known techniques. For example, the mean curve technique set forth above is one whereby the lighter the color of a point on the particular image being displayed or printed, the higher the mean curvature of that point on its surface. By way of example only, the computer generated images shown in FIGS. 1–4 were produced with a SUN Ultrasparc 10® workstation manufactured by Sun Microsystems, Inc. and can readily be displayed using an associated graphic visual input/output display apparatus, such as any of the VGA (Video Graphics Array) PC video displays.

Figure 6:
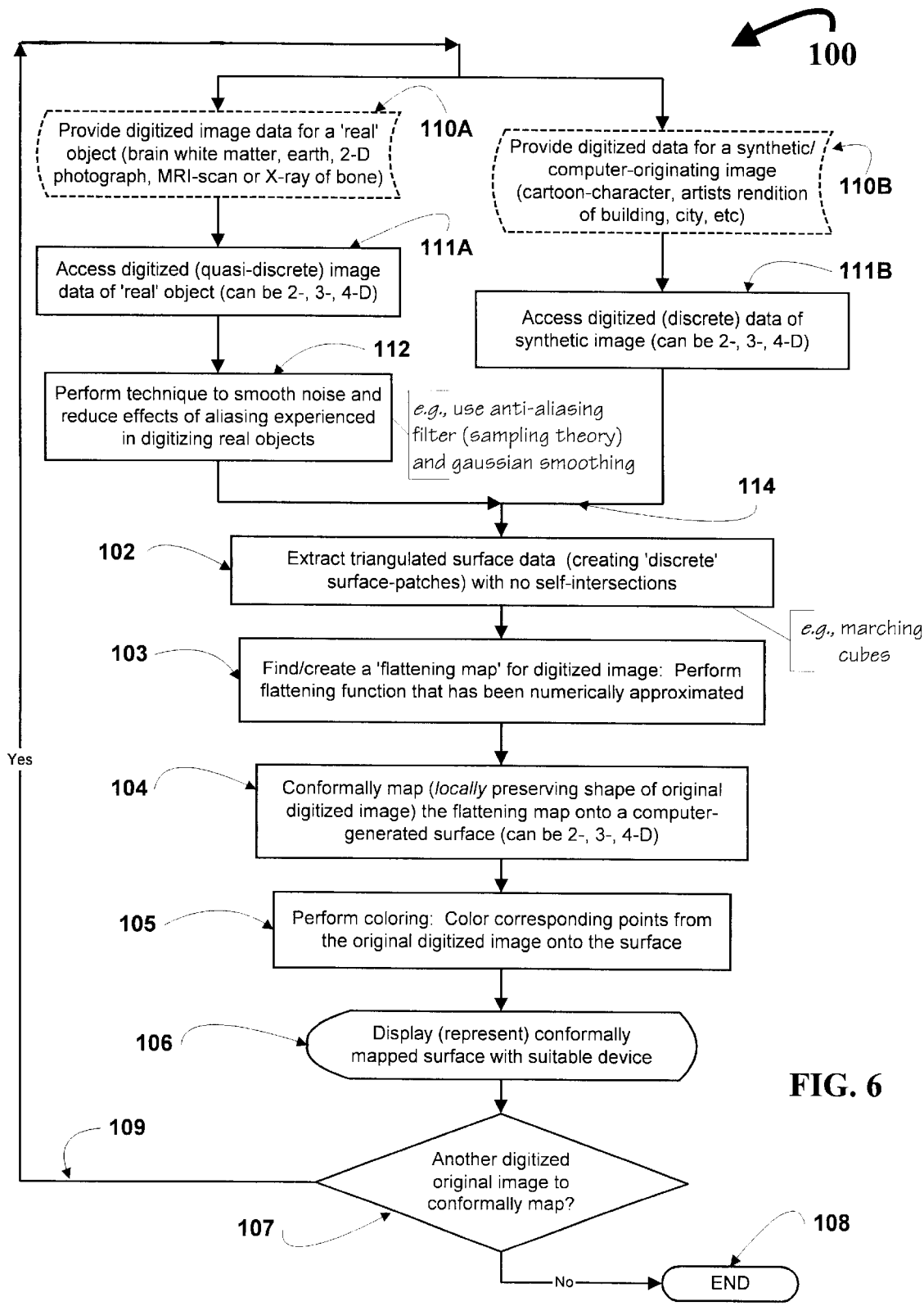
FIG. 6 is an illustrative overall flow diagram detailing not only basic steps of a preferred method of producing a flattening map of a digitized image as contemplated hereby, but also included are features which further distinguish the instant invention from known limited image flattening processes and texture mapping methods.

As one will better appreciate in connection with FIG. 6, the invention includes a computerized system and associated method and computer code on a storage medium for producing a flattening map of a digitized image (the data for which can be extracted to eliminate self-intersections, handles, holes and other geometry perturbations and can be smoothed to reduce the effects of aliasing, as necessary, such as if the image is of a real object), comprising the steps of: extracting data from the digitized image data to create a plurality of discrete surface-elements or patches preferably having no self-intersections; and numerically computing a solution to each of two sparse systems of linear equations (derived from finding a numerically approximated solution to a corresponding PDE) for each of the surface-elements. The numeric approximation can be done using, for example, a finite element method.

The step of numerically computing can be readily performed using a suitable processor such as that found in currently-available workstations, personal computers (WINDOWS™ or MACINTOSH® based platforms), mainframe computers running UNIX or Linux, and any other reliable computerized system. The linear equations used here by way of example, were derived in order to find a solution to a corresponding second-order partial differential equation (PDE) containing Δ, the Laplace-Beltrami operator (the Laplace-Beltrami operator, designated by the Greek symbol Δ, comes from a branch of mathematics called 'differential geometry,' and has been applied in the study of certain distinct areas of physics, in particular, electromagnetism).

Turning now to FIG. 6, this overall representation of a preferred method of the invention (labeled 100) describes details in a flow-diagram format. The original image (or series of images in the case where dynamic conformal mapping is done) may be that of a real object which has been digitized 110A, or it can be a synthetic image originating from a computer 110B. The digitized image data (quasi-discrete, if for the real object 110A, 111A and discrete, if for a computer-originating image 110B, 111B), which is stored as two-, three-, and/or four-dimensional dynamic coordinate data on suitable computer readable storage media may be on-site or stored remotely and accessed through a Wide Area Network, WAN (including the INTERNET™ global information network) or through a Local Area Network (LAN). Computer readable storage media/medium as used herein can be any data carrier or recording medium into which, or onto which, information (such as data) can be read and copied, such as magnetic devices (diskettes, hard disks, ZIP™/JAZ™/Click!™ disks supplied by Iomega Corporation, tapes, drums, core, thin-film, etc.), optic devices (CD-ROM, CD-E, CD-R, CD-RW, DVD, and other devices whereby readout is with a light-source and photodetector), magneto-optic media (media for which optical properties can be changed by an applied magnetic field—used in high end drives) and other such devices.

If the image data is that of a real object (110A), and it's well known that this type of quasi-discrete data has problems with aliasing, then a standard technique to smooth noise and reduce the effects of aliasing experienced in digitizing real object is performed 112. Aliasing is used generally to refer to the introduction of error into the computed amplitudes of the lower frequencies in a Fourier analysis of a function carried out using discrete time samplings whose interval does not allow proper analysis of the higher frequencies present in the analyzed function. There are several suitable anti-aliasing filers available for use: Each of which is based on utilizing low-pass pre-filters in accordance with the Nyquist sampling frequency. Following 114 as identified in FIG. 10, smoothed image data is used for the next step 102: extracting surface data from the image data, to create discrete surface-patches with preferably no self-intersections (this can be accomplished using a uniquely-modified version of a triangulated surface process to fill-in any tiny spots).

The discrete surface-patch data is used to create a flattening map 103 for the digitized image undergoing 'flattening'. By performing a flattening function of the invention that has been numerically approximated (using, for example, a finite element method), the flattening map can be generated and used alone for its valuable information, or conformally mapped in the next step 104 onto any chosen surface (2-, 3-, and/or any of the dynamically-varying family of surfaces). The conformally mapped image can then be colored 105 using a suitable graphics-coloring technique such as that known and explained above as 'mean curvature'. A representation may be communicated 106 in a suitably viewable form using any of the available computer display screens, LED displays, video-imaging equipment, and so on. If only one image is to be mapped, the method terminates at 108. If another image, or dynamic series of images, is to be flattened and then conformally mapped on another surface (box 107, then following arrow 109) one proceeds to pass through the method diagrammatically represented, again.

Turning, once again, to FIG. 6, one can appreciate that the unique dynamic conformal mapping technique disclosed herein is useful where the original image changes in some manner (shape, color, and/or orientation) with time to produce a series of conformal mappings of sequential images onto a computerized surface. As pointed out and referenced at 103, one preferably finds, or creates, a 'flattening map' for the digitized image by performing a flattening function that has been numerically approximated (using, for example, a finite element method). As explained elsewhere herein, one may numerically compute a solution to each of two sparse systems of linear equations derived from finding a solution to a corresponding partial differential equation (PDE) for each 'discrete' surface-patch of the original image's surface; this PDE preferably to contain the Laplace-Beltrami operator, denoted by $\Delta$, on $\Sigma \backslash \{p\}$. In connection with performing a coloring of the image, referenced at box 105, any suitable coloring technique may be used, such as that known as 'mean curvature' (whereby the lighter the point the higher the mean curvature on the original digitized image).

Returning to FIG. 5 which has been included for purposes of illustrating an example of a triangulated surface (refer to box 102 in FIG. 10), this computer-triangulated volume has a surface of several peaks and valleys of random shapes. A preferable method for extracting a triangulated surface (or other isosurface) from corresponding three dimensional surface data representing an object, is based on an algorithm known as 'marching cubes' (a form of linear interpolation). One such method is commercially available as part of VTK Toolkit™ software package. As one can see, the process of 'triangulating' a computer-generated surface includes the process of creating tiny triangular-shaped patches thereon to replicate the original surface shape as a very close approximation. For purposes of illustration only, FIG. 5 shows the triangles as relatively large in comparison with the tiny triangular-shaped patches preferably used in the instant invention (which, in mathematical terms, go to an infinitely small 'limit').

Note that, while the apparatus, and associated method and program code of the invention have been described in connection with data sets represented as triangulated-element surfaces, the novel application of a mathematically procedure comprising the 'discretizing' of the Laplace-Beltrami operator for digital surface flattening can be applied to a multitude of surface formats including those currently considered standard surface formats. The advantage of using a triangulated surface, such as that represented by way of example in FIG. 5, for digital surface flattening is that it allows one to use and apply reliable finite-elements theory and procedures. Specific further distinguishing features and steps of the method of the invention, as characterized herein, are readily ascertainable from this detailed disclosure and as further represented in the figures and attachments.

Following is a mathematical analysis of a preferred flattening procedure. For this analysis, start with the basic assumption that the brain surface may be approximated as a topological sphere. While there may be some small holes where the ventricles connect to the outer surface, these can be filled-in by using filling techniques, e.g., morphological dilation and erosion. This will not affect the surface structures which will be flattened, in particular here, a mammalian brain hemispheres. Let $\Sigma \subset R^3$ represent this brain model, and assume the set of surface data is an embedded surface (i.e, no self-intersections) of genus zero so that $\Sigma$ is a smooth manifold. For the finite-element method described in the next section, it will be enough to take it as a triangulated surface. Fix a point p on this surface. Let $\sigma$ denote the Dirac delta (impulse) function at p, $\Delta$, the Laplace-Beltrami operator on $\Sigma \backslash \{p\}$, and i the square root of −1. The Laplace-Beltrami operator is the generalization of the usual Laplacian operator to a smooth surface. Let $S^2$ denote the unit sphere in $R^3$ and let C be the complex plane. Recall that a conformal equivalence is a one-to-one onto mapping which preserves angles. We can now state the following result which provides the analytical basis for our texture mapping procedure.

A conformal equivalence $z:\Sigma\backslash\{p\}\to S^2\backslash\{\text{north pole}\}$ may be obtained by solving the expression which is Eq. (1) from above:

$$\Delta z = \left(\frac{\partial}{\partial u} - i\frac{\partial}{\partial v}\right)\delta_p \qquad \text{Eq. (1)}$$

Here, u and v are conformal coordinates defined in a neighborhood of p. The definition of conformal coordinates and the derivation of Eq. (1) is below. Further, in the standard way from complex analysis $S^2\backslash\{\text{north pole}\}$ is being identified with the complex plane via stereographic projection. This is the mapping that sends (x, y, z) on the unit sphere to the point $(x/(1-z), y/(1-z))$ in the complex plane. This result means that the conformal equivalence can be obtained by solving a second-order partial differential equation on the surface. Fortunately, on a triangulated surface, this may be carried out using a finite-element technique as describe below.

Below is a derivation of the partial differential equation Eq. (1). First choose conformal coordinates (u, v) on $\Sigma$ near p, with u=v=0 at p. Conformal coordinates u, v are such that the metric at the point p is of the form $ds^2=\lambda^2(p)(du^2+dv^2)$. One can show that such conformal coordinates will exist. Put w=u+iv. Since z is one to one, it follows that it has a simple pole at p, and thus a Laurent series expansion given by $$z(w) = \frac{A}{w} + B + Cw + Dw^2 \ldots .$$

Since all terms except the first in this Laurent series are smooth (harmonic) at w=0, applying $\Delta$ to both sides yields $$\Delta z = A\Delta\left(\frac{1}{w}\right).$$

One, then, can find z up to a constant multiple, so taking $A=1/2\pi$ $$\Delta z = \frac{1}{2\pi}\Delta\left(\frac{1}{w}\right)$$
$$= \frac{1}{2\pi}\Delta\left(\frac{\partial}{\partial u} - i\frac{\partial}{\partial v}\right)\log|w|$$
$$= \frac{1}{2\pi}\left(\frac{\partial}{\partial u} - i\frac{\partial}{\partial v}\right)\Delta\log|w|$$
$$= \frac{1}{2\pi}\left(\frac{\partial}{\partial u} - i\frac{\partial}{\partial v}\right)(2\pi\delta_p(w))$$
$$= \left(\frac{\partial}{\partial u} - i\frac{\partial}{\partial v}\right)\delta_p(w)$$

Now show the following Theorem 1: The conformal map $z_0$. $\Sigma\backslash\{p\}\to S^2\backslash\{\text{north pole}\}\cong\mathbb{C}$ may be obtained by solving the expression, identified above as Eq. (1):

$$\Delta z = \left(\frac{\partial}{\partial u} - i\frac{\partial}{\partial v}\right)\delta_p.$$

To prove this result, we note that from the above argument, here one need only demonstrate existence. But finding a solution to the above expression, identified above as Eq. (1), is possible because the right-hand side integrates out to zero:

$$\iint_\Sigma \left(\frac{\partial}{\partial u} - i\frac{\partial}{\partial v}\right)\delta_p dS = -\left(\frac{\partial}{\partial u} - i\frac{\partial}{\partial v}\right)(1)|_p = 0$$

The discussion of the finite element approximation of conformal mapping begins with the following: Here, assume that $\Sigma$ is a triangulated surface. Using the notation of the previous section, let $\sigma$=ABC be the triangle in whose interior the point p lies. In order to solve Eq. (1) we therefore need to find an approximation to its right-hand side, namely, $$\left(\frac{\partial}{\partial u} - i\left(\frac{\partial}{\partial v}\right)\right)\delta_p.$$

The key is to interpret $$\left(\frac{\partial}{\partial u} - i\left(\frac{\partial}{\partial v}\right)\right)\delta_p$$

a functional on an appropriate space of functions, in this case, the finite-dimensional space PL) of piecewise linear functions on $\Sigma$. One, thus, must identify how $$\left(\frac{\partial}{\partial u} - i\left(\frac{\partial}{\partial v}\right)\right)\delta_p$$

acts on elements of this function space.

For any function f smooth in a neighborhood of p, one has $$\iint_\Sigma f\left(\frac{\partial}{\partial u} - i\frac{\partial}{\partial v}\right)\delta_p dS = -\iint_\Sigma \left(\frac{\partial}{\partial u} - i\frac{\partial}{\partial v}\right)f\delta_p(w) dS$$
$$= -\left(\frac{\partial f}{\partial u} - i\frac{\partial f}{\partial v}\right)\Big|_p$$

For details of the approximation of Eq. (1), see reference [1] listed above entitled "On the Laplace-Beltrami Operator and Brain Surface Flattening." Then, to approximate z on the left hand side of Eq. (1), the applicants applied the classical fact that z=x+iy is a minimizer of the Dirichlet functional that follows $$D(z) := \frac{1}{2}\iint_\Sigma \left\{|\nabla z|^2 + 2z\left(\frac{\partial}{\partial u} - i\frac{\partial}{\partial v}\right)\delta_p\right\} dS$$

where $\nabla z$ is the gradient with respect to the induced metric on $\Sigma$.

In short, a vector of complex numbers, numbers $z=(z_P)$, containing one element per vertex, is sought such that for all Q, which will be identified as Eq. (9) herein for discussion:

$$\sum_P z_P \iint \nabla\phi_P \cdot \nabla\phi_Q dS = \frac{\partial\phi_Q}{\partial u}(p) - i\frac{\partial\phi_Q}{\partial v}(p).$$

The formulation Eq, (9) set forth immediately above is a system of linear equations in the complex unknowns $z_P$. Accordingly, we introduce the matrix $(D_{PQ})$ where $$D_{PQ} = \iint \nabla\phi_P \cdot \nabla\phi_Q dS$$

for each pair of vertices P, Q. It is easily seen that $D_{PQ}\neq 0$ only if P and Q are connected by some edge in the triangulation (see FIG. 1, Triangle geometry, of see reference [1] listed above entitled "On the Laplace-Beltrami Operator and Brain Surface Flattening" to identify segments PQ as well as the referenced angles). Thus, the matrix D is sparse. Suppose PQ is an edge belonging to two triangles, PQR and PQS. A formula from finite-element theory, readily verified with basic trigonometry, says that $$D_{PQ} = -\frac{1}{2}\{\cot \angle R + \cot \angle S\}, P \neq Q$$

where $\angle R$ is the angle at the vertex R in the triangle PQR and $\angle S$ is the angle at the vertex S in the triangle PQS. (See FIG. 1 of reference [1]). Since $$\sum_P D_{PQ} = \sum_P \int \nabla \phi_P \cdot \nabla \phi_Q = \int \nabla 1 \cdot \nabla \phi_Q = 0$$

one can see that the diagonal elements of D may be found from the following expression $$D_{PP} = -\sum_{P \neq Q} D_{PQ}$$

Then Eq. (9) identified above becomes in matrix terms: $D_x = a$, $D_y = -b$. Using the formula for the right hand side of Eq. (1), or $$\left(\frac{\partial}{\partial u} - i\left(\frac{\partial}{\partial v}\right)\right)\delta_p$$

one gets the following:

$$a_Q - ib_Q = \begin{cases} 0, & Q \notin \{A, B, C\} \\ \frac{-1}{\|B-A\|} + i\frac{1-\theta}{\|C-E\|}, & Q = A \\ \frac{1}{\|B-A\|} + i\frac{\theta}{\|C-E\|}, & Q = B \\ i\frac{-1}{\|C-E\|}, & Q = C \end{cases}$$

To summarize this discussion of the finite-element approximation procedure for the construction of the flattening map z:

1) Compute $D_{PQ}$, $a_Q$, and $b_Q$ using the following expressions (also set forth above):

$$D_{PQ} = -\frac{1}{2}\{\cot \angle R + \cot \angle S\}, P \neq Q$$

$$D_{PP} = -\sum_{P \neq Q} D_{PQ}$$

$$a_Q - ib_Q = \begin{cases} 0, & Q \notin \{A, B, C\} \\ \frac{-1}{\|B-A\|} + i\frac{1-\theta}{\|C-E\|}, & Q = A \\ \frac{1}{\|B-A\|} + i\frac{\theta}{\|C-E\|}, & Q = B \\ i\frac{-1}{\|C-E\|}, & Q = C \end{cases}$$

2) Solve the systems of linear equations (identified above) to obtain the piecewise linear harmonic functions:

$$x = \sum_Q x_Q \phi_Q$$

$$y = \sum_Q y_Q \phi_Q$$

and obtain a conformal mapping z=x+iy onto the complex plane.

3) Compose z=x+iy with inverse stereographic projection to get a conformal map to the unit sphere. Specifically, send the point x+iy to the point $(2x/(1+r^2), 2y/(1+r^2), (1+r^2)-1)$ where $r^2=x^2+y^2$.

Further analysis has be done by the applicants hereof and set forth in a recently published article attached hereto as reference [1] identified above entitled "On the Laplace-Beltrami Operator and Brain Surface Flattening".

While certain representative embodiments and details have been shown merely for the purpose of illustrating the invention, those skilled in the art will readily appreciate that various modifications may be made without departing from the novel teachings or scope of this invention. Accordingly, all such modifications are intended to be included within the scope of this invention as defined in the following claims. Although the commonly employed preamble phrase "comprising the steps of" may be used herein, or hereafter, in a method claim, the Applicants in no way intends to invoke 35 U.S.C. section 112 ¶6. Furthermore, in any claim that is filed hereafter, any means-plus-function clauses used, or later found to be present, are intended to cover the structures described herein as performing the recited function and not only structural equivalents but also equivalent structures.

What is claimed is:

1. A computerized apparatus for producing a flattening map of a digitized image, comprising:

a processor for constructing a first set of data comprising a plurality of discrete surface-elements to represent at least a portion of a surface of the digitized image, and performing a flattening function on said first set of data to produce the flattening map; and said flattening function to comprise computing, for each said discrete surface-element, a solution to each of two systems of linear equations formulated from finding a numerical solution to a selected partial differential equation (PDE) derived by applying a Laplace-Beltrami operator.

2. The apparatus of claim 1 wherein said discrete surface-elements are triangulated elements, said two systems of linear equations have been formulated by applying a finite-element approximation comprising a sparse matrix, and said PDE is a second order PDE.

3. The apparatus of claim 2 wherein said two systems of linear equations comprise the expressions $D_x=a$, $D_y=-b$, $D_x$ and $D_y$ represent elements of said sparse matrix with a and b denoting associated vectors, z=x+iy where z represents the flattening map; and said second order PDE comprises the expression, $$\Delta z = \left(\frac{\partial}{\partial u} - i\frac{\partial}{\partial v}\right)\delta_p,$$

where p represents a point on an embedded surface, $\Sigma$, of genus zero, u and v represent conformal coordinates defined in proximity to said point p, $\delta_p$ denotes the Dirac delta function at said point p, $\Delta$ denotes said Laplace-Beltrami operator on $\Sigma\backslash\{p\}$, and i represents square root of $-1$.

4. The apparatus of claim 3 wherein said flattening function further comprises identifying values for the variables $D_{PQ}$, $a_Q$ and $b_Q$, where $D_{PQ}$ denotes a matrix, $a_Q$ and $b_Q$ denote associated vectors, said embedded surface, $\Sigma$, is a triangulated surface, P and Q are a pair of vertices with PQ as an edge of a first and second triangle PQR and PQS, using at least the following expressions:

$$D_{PQ} = -\frac{1}{2}\{\cot\angle R + \cot\angle S\}, \quad P \neq Q$$

$$D_{PP} = -\sum_{P \neq Q} D_{PQ}$$

$$a_Q - ib_Q = \begin{cases} 0, & Q \notin \{A, B, C\} \\ \frac{-1}{\|B-A\|} + i\frac{1-\theta}{\|C-E\|}, & Q = A \\ \frac{1}{\|B-A\|} + i\frac{\theta}{\|C-E\|}, & Q = B \\ i\frac{-1}{\|C-E\|}, & Q = C, \end{cases}$$

wherein $\angle R$ is an angle at vertex R in a triangle PQR, $\angle S$ is an angle at vertex S in a triangle PQS, and ABC represents points of a triangle in whose interior said point p lies.

5. The apparatus of claim 1 wherein:
the digitized image is of a cortical structure said surface of which is at least partially smoothed upon said constructing said first set of data, said surface-elements are selected from the group consisting of triangulated areas, random-shaped areas, surface points, pixels, sub-pixels, cells, sub-cells, segments, and sub-segments;
said PDE comprises the expression, $$\Delta z = \left(\frac{\partial}{\partial u} - i\frac{\partial}{\partial v}\right)\delta_p,$$

where p represents a point on an embedded surface, $\Sigma$, of genus zero, u and v represent conformal coordinates defined in proximity to said point p, $\delta_p$ denotes the Dirac delta function at said point p, $\Delta$ denotes said Laplace-Beltrami operator on $\Sigma\backslash\{p\}$, and i represents square root of $-1$; and
the flattening map is then conformally mapped onto a spherical surface that is displayed on a computer-assisted display apparatus in communication with said processor.

6. The apparatus of claim 1 wherein:
the digitized image is a computer-generated 3-D image, said surface-elements having been selected from the group consisting of triangulated areas, random-shaped areas, surface points, pixels, sub-pixels, cells, sub-cells, segments, and sub-segments;
said PDE comprises the expression, $$\Delta z = \left(\frac{\partial}{\partial u} - i\frac{\partial}{\partial v}\right)\delta_p,$$

where p represents a point on an embedded surface, $\Sigma$, of genus zero, u and v represent conformal coordinates defined in proximity to said point p, $\delta_p$ denotes the Dirac delta function at said point p, $\Delta$ denotes said Laplace-Beltrami operator on $\Sigma\backslash\{p\}$, and i represents square root of $-1$; and
the flattening map is then conformally mapped onto a computer-generated 3D surface that is displayed on a computer-assisted display apparatus in communication with said processor.

7. The apparatus of claim 6 wherein the 3-D image changes shape over time such that said construction of said first set of data further comprises constructing a series of said first sets of data correspondingly over time and said flattening function is performed on each of said series of said first sets to produce a corresponding series of the flattening maps.

8. A computerized apparatus for producing a flattening map of a digitized image for conformally mapping onto a computer-generated surface, comprising:
a processor for constructing a first set of data comprising a plurality of discrete surface-elements to represent at least a portion of a surface of the digitized image, and performing a flattening function on said first set of data to produce the flattening map; and
said flattening function to comprise computing a numerical approximation of the solution to a selected partial differential equation (PDE), $$\Delta z = \left(\frac{\partial}{\partial u} - i\frac{\partial}{\partial v}\right)\delta_p,$$

for said first set of data, where p represents a point on an embedded surface, $\Sigma$, of genus zero, u and v represent conformal coordinates defined in proximity to said point p, $\delta_p$ denotes the Dirac delta function at said point p, $\Delta$ denotes a Laplace-Beltrami operator on $\Sigma\backslash\{p\}$, and i represents square root of $-1$.

9. The apparatus of claim 8 wherein said flattening function has been derived by initially applying a finite-element approximation to formulate two sparse systems of linear equations, and said computing said numerical approximation further comprises computing a solution to each of said two sparse systems for each said discrete surface-element.

10. The apparatus of claim 9 wherein:
the digitized image is of an object, said plurality of discrete surface-elements comprises an extraction of said surface that is of genus zero, and said surface-elements are triangulated elements;
said two systems of linear equations comprise the expressions $$D_x = a$$

$$D_y = -b$$

where $D_x$ and $D_y$ represent elements of said sparse matrix with a and b denoting associated vectors, $z = x + iy$ where z represents the flattening map; and
the flattening map is then conformally mapped onto a computer-generated surface that is displayed on a computer-assisted display apparatus in communication with said processor.

11. A method for producing a flattening map of a digitized image, comprising:
constructing a first set of data with a processor, said data comprising a plurality of discrete surface-elements to represent at least a portion of a surface of the digitized image; and
performing a flattening function on said first set of data to produce the flattening map, said flattening function to comprise computing, for each said discrete surface-element, a solution to each of two systems of linear equations formulated from finding a numerical solution to a selected partial differential equation (PDE) derived by applying a Laplace-Beltrami operator.

12. The method of claim 11 wherein:

said two systems of linear equations comprise the expressions $D_x = a$, $D_y = -b$, $D_x$ and $D_y$ represent elements of said sparse matrix with a and b denoting associated vectors, $z = x + iy$ where z represents the flattening map; said selected PDE comprises the expression, $$\Delta z = \left(\frac{\partial}{\partial u} - i\frac{\partial}{\partial v}\right)\delta_p,$$

where p represents a point on an embedded surface, $\Sigma$, of genus zero, u and v represent conformal coordinates defined in proximity to said point $\delta_p$ denotes the Dirac delta function at said point p, $\Delta$ denotes said Laplace-Beltrami operator on $\Sigma\backslash\{p\}$, and i represents square root of −1;

and said flattening function further comprises identifying values for the variables $D_{PQ}$, $a_Q$ and $b_Q$, where $D_{PQ}$ denotes a matrix, $a_Q$ and $b_Q$ denote associated vectors, said embedded surface, $\Sigma$, is a triangulated surface, P and Q are a pair of vertices with PQ as an edge of a first and second triangle PQR and PQS, using the following expressions:

$$D_{PQ} = -\frac{1}{2}\{\cot\angle R + \cot\angle S\}, \quad P \neq Q$$

$$D_{PP} = -\sum_{P \neq Q} D_{PQ}$$

$$a_Q - ib_Q = \begin{cases} 0, & Q \notin \{A, B, C\} \\ \frac{-1}{\|B-A\|} + i\frac{1-\theta}{\|C-E\|}, & Q = A \\ \frac{1}{\|B-A\|} + i\frac{\theta}{\|C-E\|}, & Q = B \\ i\frac{-1}{\|C-E\|}, & Q = C, \end{cases}$$

wherein $\angle R$ is an angle at vertex R in a triangle PQR, $\angle S$ is an angle at vertex S in a triangle PQS, and ABC represents points of a triangle in whose interior said point p lies.

13. The method of claim 12 wherein:

said step of computing a solution to each of two systems results in a plurality of piecewise linear harmonic functional expressions comprising an expression for x and an expression for y;

$$x = \sum_Q x_o \phi_o$$

$$y = \sum_Q y_o \phi_o$$

and the method further comprises the steps of conformally mapping x and y according to said expression $z = x + iy$ onto a preselected computer-generated surface, and displaying on a computer-assisted display apparatus said conformal mapping.

14. A method for producing a flattening map of a digitized image for conformally mapping onto a computer-generated surface for display, the method comprising the steps of:

constructing a first set of data comprising a plurality of discrete surface-elements to represent at least a portion of a surface of the digitized image; and performing a flattening function on said first set of data to produce the flattening map; said flattening function to comprise computing a numerical approximation of the solution to a selected partial differential equation (PDE), $$\Delta z = \left(\frac{\partial}{\partial u} - i\frac{\partial}{\partial v}\right)\delta_p,$$

for said first set of data, where p represents a point on an embedded surface, $\Sigma$, of genus zero, u and v represent conformal coordinates defined in proximity to said point p, $\delta_p$ denotes the Dirac delta function at said point p, $\Delta$ denotes a Laplace-Beltrami operator on $\Sigma\backslash\{p\}$, and i represents square root of −1.

15. The method of claim 14 wherein:

the digitized image is of a cortical structure said surface of which is at least partially smoothed upon said constructing said first set of data, said surface-elements are selected from the group consisting of triangulated areas, random-shaped areas, surface points, pixels, sub-pixels, cells, sub-cells, segments, and sub-segments, and said flattening function further comprises initially applying a finite-element approximation to formulate two sparse systems of linear equations; and further comprising the steps of conformally mapping the flattening map onto said computer-generated surface and displaying said conformal mapping on a computer-assisted display apparatus.

16. The method of claim 14 wherein the digitized image is of an object, said plurality of discrete surface-elements comprises an extraction of said surface that is of genus zero, and said surface-elements are triangulated elements; and further comprising the steps of conformally mapping the flattening map onto said computer-generated surface and displaying said conformal mapping on a computer-assisted display apparatus.

17. A computer executable program code on a computer readable storage medium for producing a flattening map of a digitized image, the program code comprising:

a first program sub-code for constructing a first set of data comprising a plurality of discrete surface-elements to represent at least a portion of a surface of the digitized image; and a second program sub-code for performing a flattening function on said first set of data to produce the flattening map, said second sub-code comprising instructions for computing, for each said discrete surface-element, a solution to each of two systems of linear equations formulated from finding a numerical solution to a selected partial differential equation (PDE) derived by applying a Laplace-Beltrami operator.

18. The program code of claim 17 wherein: said two systems of linear equations have been formulated by applying a finite-element approximation; the digitized image is a computer-generated 3-D image; said surface-elements are triangulated elements; and further comprising a third program sub-code for conformally mapping the flattening map onto a computer-generated 3D surface for display on a computer-assisted display apparatus.

19. A computer executable program code on a computer readable storage medium for producing a flattening map of a digitized image to be conformally mapped onto a computer-generated surface for display, the program code comprising:

a first program sub-code for constructing a first set of data comprising a plurality of discrete surface-elements to represent at least a portion of a surface of the digitized image; and a second program sub-code for performing a flattening function on said first set of data to produce the flattening map; said second sub-code comprising instructions for computing a numerical approximation of the solution to a selected partial differential equation (PDE), $$\Delta z = \left(\frac{\partial}{\partial u} - i\frac{\partial}{\partial v}\right)\delta_p,$$

for said first set of data, where p represents a point on an embedded surface, $\Sigma$, of genus zero, u and v represent conformal coordinates defined in proximity to said point p, $\delta_p$ denotes the Dirac delta function at said point p, $\Delta$ denotes a Laplace-Beltrami operator on $\Sigma\backslash\{p\}$, and i represents square root of $-1$.

20. The program code of claim 19 wherein said flattening function has been derived by initially applying a finite-element approximation to formulate two systems of linear equations, and said second sub-code further comprises instructions for computing a solution to each of said two systems of linear equations; and further comprising a third program sub-code for said conformal mapping of the flattening map onto said computer-generated surface and displaying said conformal mapping on a computer-assisted display apparatus.

* * * * *